United States Patent [19]

Kommissari

[11] 4,286,317
[45] Aug. 25, 1981

[54] FORCED COMMUTATION POWER CONVERTER ARRANGEMENT IN REVERSE VOLTAGE FREE CIRCUIT CONFIGURATION

[75] Inventor: Karl Kommissari, Hemsbach, Fed. Rep. of Germany

[73] Assignee: BBC Brown, Boveri & Co. Ltd., Baden, Switzerland

[21] Appl. No.: 67,179

[22] Filed: Aug. 16, 1979

[51] Int. Cl.³ .............................................. H02M 7/515
[52] U.S. Cl. ................................................... 363/136
[58] Field of Search ............. 363/27, 28, 58, 135–138; 307/252 M

[56] References Cited

U.S. PATENT DOCUMENTS

| | | | |
|---|---|---|---|
| 3,313,999 | 4/1967 | Jewett | 363/135 |
| 3,932,798 | 1/1976 | Chalmers et al. | 363/138 |

FOREIGN PATENT DOCUMENTS 250277  6/1970  U.S.S.R. .................................. 363/137

OTHER PUBLICATIONS

Etz-A, Bd. 90 (1969), H.14, pp. 353–357, (German Article).
Vde-Buchreihe, Bd. 11, pp. 135–150, Vde-Verlag Berlin, 1966, (German Article).

*Primary Examiner*—William H. Beha, Jr.
*Attorney, Agent, or Firm*—Werner W. Kleeman

[57] ABSTRACT

With forced commutation static power or current converters having extinguishing or interruption circuit connected to the individual power switching branches and employing controllable extinguishing or turnoff valves, there exists the problem of unsymmetrical voltage build-up in the extinguishing circuits with corresponding overload or overdimensioning of the extinguishing valves, also referred to as commutation valves. This problem is solved, according to the invention, by arranging the usual commutation capacitor between the power switching branches, i.e., the load circuits, and the extinguishing valves, i.e., the commutation valves, and by arranging a damping circuit between the commutation capacitor and the extinguishing valves. The damping circuit is connected, by special valves, with positive and negative limiting potential. The undesired non-symmetry is thus effectively reduced.

8 Claims, 8 Drawing Figures

FORCED COMMUTATION POWER CONVERTER ARRANGEMENT IN REVERSE VOLTAGE FREE CIRCUIT CONFIGURATION

BACKGROUND OF THE INVENTION

The present invention relates to a new and improved construction of a forced commutation static power or current converter arrangement in a reverse voltage free circuit configuration.

In its more specific aspects, the forced commutation power or current converter arrangement in reverse voltage free circuit configuration comprises a commutation circuit, composed of controllable current converter valves arranged in parallel opposition or antiparallel connection, a commutator capacitor and a commutator reactance coil or choke, a load circuit composed of controllable current converter valves, non-controllable current converter valves arranged in parallel opposition thereto and reactance coils or chokes. Further, there are provided two capacitors arranged between positive and negative d.c.-voltage infeed or supply. The circuit can be employed, for instance, for producing an alternating-current voltage from a direct-current voltage or for producing an alternating-current voltage from an alternating-current voltage of a different frequency.

A typical example of a forced commutation current converter arrangement in reverse voltage free circuit configuration is known to the art from ETZ-A, Bd. 90 (1969), H. 14, pages 353–357 in the article of J. Brenneisen and A. Schönung, entitled "Bestimmungsgroössen des selbstgeführten Stromrichters in sperrspannungsfreier Schaltung bei Steuerung nach dem Unterschwingungsverfahren". For describing such type arrangement reference is also made to the article of H. W. van den Boom and E. Kohlhuber, entitled "Beanspruchung von Thyristroen in Wechselrichterschaltungen", VDE-Buchreihe, Bd. 11 "Energieelektronik und geregelte elektrische Antriebe", pages 135–150, VDE-Verlag Berlin 1966.

With such current converters, during operation, there disadvantageously can arise unsymmetrical shifting of the commutation processes. Consequently, the commutation circuit must be overdimensioned. In unfavorable situtions, by virtue of such unsymmetry in the commutation current, there can prevail an operational disturbance in the current converter.

SUMMARY OF THE INVENTION

Therefore, with the foregoing in mind it is a primary object of the present invention to provide a new and improved construction of forced commutation static power or current converter arrangement in a reverse voltage free circuit configuration, which is not afflicted with the aforementioned drawbacks and shortcomings of the prior art proposals.

Another and more specific object of the present invention aims at the provision of a new and improved construction of a forced commutation current converter arrangement in a reverse voltage free circuit configuration which is capable of a compsensating possibly arising non-symmetry in the commutation operation. Now in order to implement these and still further objects of the invention, which will become more readily apparent as the description proceeds, the invention contemplates that the commutator capacitor is arranged between the controllable current converter valves of the commutation circuit and the current converter valves of the load circuit. Between the commutator capacitor and the current converter valves of the commutation circuit there is arranged a damping circuit. By means of current converter valves this damping circuit can have applied thereto the positive and the negative potential of the supply d.c.-voltage.

The advantages which can be realized with the invention particularly reside in the fact that there can be compensated unsymmetrical shifting of the commutation operations, i.e., there are avoided overvoltages at the commutator or commutation capacitor and each commutation operation begins with a defined commutator capacitor potential or voltage.

The damping circuit can be composed of two branches or also three branches. In the embodiment employing two branches each branch contains a series circuit of a resistance and a current converter valve.

In the construction employing three branches, there are applied to two of the branches, by means of current converter valves, the positive and the negative potential of the supply d.c.-voltage and one branch contains a resistance and is arranged between th commutator capacitor and the current converter valves of the commutation circuit.

In comparison to the embodiment employing two branches, the embodiment containing three branches is simpler, since it only possesses one resistance or resistor. However, usually also the three-branch construction will be designed to have a resistance in each branch, in order not to endanger the current converter valves of the damping circuit.

With all embodiments of the damping circuit there is possible, according to an advantageous construction of the invention, for there to be connected in series to the individual resistances in each case a reactance coil or choke.

There are used in th circuits described hereinafter as the controllable current converter valves thyristors and as the non-controllable current converter valves diodes. Depending upon the fields of application there can be used as the current converter valves of the damping circuit controllable valves, for instance thyristors, or also non-controllable valves, diodes. In the exemplary embodiments described hereinafter there are employed diodes as the current converter valves of the damping circuit.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
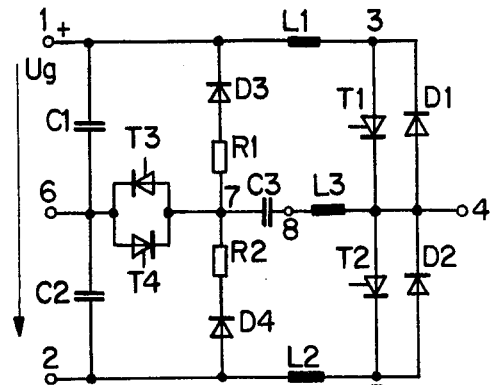
FIG. 1 illustrates a circuit diagram of a single-phase static power or current converter arrangement containing a damping circuit according to the invention.

Describing now the drawings, in FIGS. 1, 3, 4, 5, 6, 7 and 8 there have been illustrated inventive single-phase, forced commutation static power or current converter arrangements in reverse voltage free circuit configuration. Between a positive d.c.-voltage infeed 1 and a negative d.c.-voltage infeed 2, constituting a d.c. supply, there are arranged in series circuit two capacitors $C_1$ and $C_2$. The supply direct-current voltage has been designated by reference character $U_g$. The positive d.c.-voltage infeed 1 is connected by means of a reactance coil or choke $L_1$ and a junction or connection point 3 with a controllable current converter valve $T_1$, referred to hereinafter as the primary thyristor $T_1$, and with a non-controllable current converter valve $D_1$ connected in parallel opposition thereto, referred to hereinafter as the primary diode $D_1$. The primary thyristor $T_1$ is connected at the side of the anode with the junction or connection point 3, whereas the primary diode $D_1$ is connected at the side of the cathode at the junction or connection point 3. The further terminals or connections of the current converters $T_1$ and $D_1$ are connected with an output terminal 4.

The negative d.c.-voltage infeed 2 is connected by means of a reactance coil or choke $L_2$ and a junction or connection point 5 with a controllable current converter valve $T_2$, referred to hereinafter as the primary thyristor $T_2$, and with a non-controllable current converter valve $D_2$ connected in parallel opposition thereto, referred to hereinafter as the primary diode $D_2$. The primary thyristor $T_2$ is connected at its cathode side with the junction 5, whereas the primary diode $D_2$ is connected at its anode side with the junction or connection point 5. The further connections or terminals of the current converters $T_2$ and $D_2$ are connected with the output terminal 4.

The arrangement composed of the primary thyristors $T_1$, $T_2$, the primary diodes $D_1$, $D_2$ and the reactance coils or chokes $L_1$, $L_2$ is referred to as load circuit. This load circuit is powered at the d.c.-voltage side by means of the infeeds or infeed means 1 and 2 and, apart from possessing the alternating-current voltage side output terminal 4, has a further output terminal 6 arranged at the location of the common connection or node of the capacitors $C_1$ and $C_2$.

A commutation circuit is arranged between the output terminals 4 and 6. It consists of a commutator or commutation capacitor $C_3$, a commutation or commutator coil $L_3$ and two controllable current converter valves $T_3$, $T_4$ arranged in parallel opposition, referred to hereinafter as the auxiliary thyristors $T_3$ and $T_4$. Considering this arrangement in greater detail, the auxiliary thyristors $T_3$, $T_4$ are arranged at the output terminal 6 and at a connection point or junction 7. With the circuit configurations of FIGS. 1, 3, 4 and 5 the commutator capacitor $C_3$ is arranged between the junction or connection point 7 and a further connection point or junction 8, whereas the commutator choke $L_3$ is located between the junction or connection point 8 and the output terminal 4.

Figure 6:
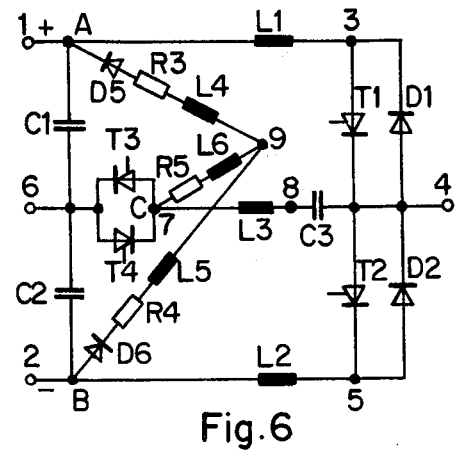
Figure 7:
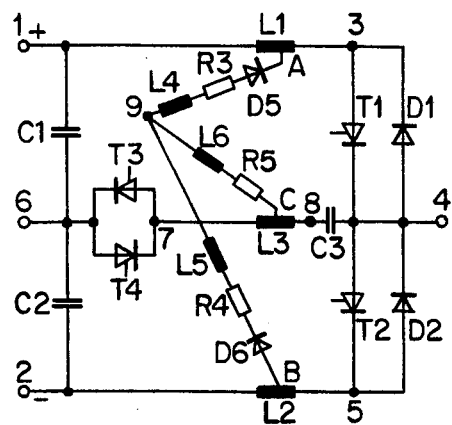
Figure 8:
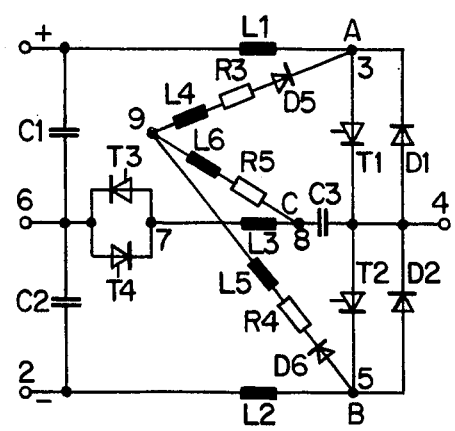

The commutator choke $L_3$ and the commutator capacitor $C_3$, with the arrangements of FIGS. 6, 7 and 8, are mutually interchanged in their position, so that then the commutator capacitor $C_3$ is located between the connection or output terminal 4 and the connection point or junction 8 and the commutator choke $L_3$ between the connection points or junctions 7 and 8.

Apart from the circuit description which is valid for the circuit arrangements of FIGS. 1 and 3 to 8, there will be illustrated and described hereinafter the different arrangements of a damping circuit for the individual exemplary embodiments.

According to the showing of FIG. 1, a branch of the damping circuit, composed of a resistor or resistance $R_1$ and a diode $D_3$, is arranged between the junction 7 and the positive d.c.-voltage infeed 1. A further branch of the damping circuit, composed of a resistor or resistance $R_2$ and a diode $D_4$, is arranged between the junction or connection point 7 and the negative d.c.-voltage infeed 2. The circuit arrangement of FIG. 1 can be expanded upon in that, a choke is connected in each case in series with the resistors $R_1$ and $R_2$. Moreover, the diode $D_4$ can be connected with the junction 5 and the diode $D_3$ with the junction 3. A further possibility resides in connecting the diode $D_4$ with a tap of the reactance coil or choke $L_2$ and the diode $D_3$ with a tap of the reactance coil or choke $L_1$.

In the event the commutator choke $L_3$ and the commutator capacitor $C_3$ are interchanged in their position, then apart from the already mentioned connection possibilities, there are realized further variation possibilities. The common connection of both branches of the damping circuit then can be optionally accomplished at the connection point or junction 7, in other words between the auxiliary thyristors $T_3$, $T_4$ and the choke $L_3$ at a tap of the choke $L_3$ or at the junction 8, in other words between the choke $L_3$ and the capacitor $C_3$.

Figure 2:
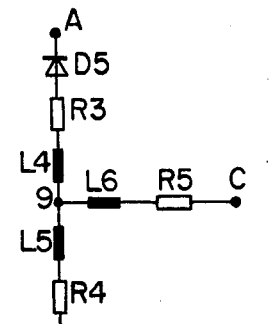
FIG. 2 illustrates a possible construction of a damping circuit.

Now in FIG. 2 there is illustrated a damping circuit employed in the further embodiments according to FIGS. 3 to 8. It consists of three star-shaped connected individual branches of a damping circuit having three connection terminals A, B, C and a common connection point or junction 9. Between the connection terminal A and the junction or node 9 there is arranged the series circuit of a diode $D_5$ with, optionally, a resistance $R_3$ and, optionally, a choke $L_4$. Between the connection terminal B and the connection point or node 9 there is arranged the series circuit of a diode $D_6$ with, optionally, a resistance $R_4$ and, optionally, a choke $L_5$, whereas between the connection terminal C and the connection point or node 9 there is connected in series a resistance $R_5$, optionally, with a choke $L_6$.

Figure 3:
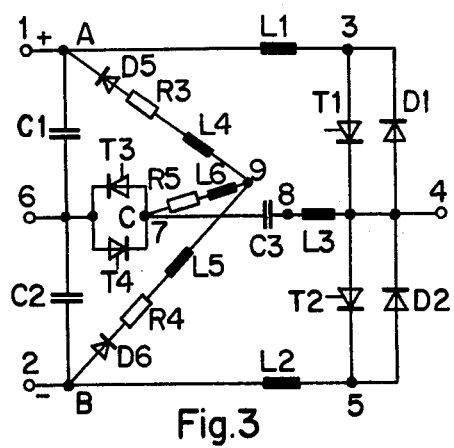
FIGS. 3 to 8 respectively illstrate power or current converter arrangements having variant constructions of damping circuits.

In the embodiment according to FIG. 3 this damping circuit of FIG. 2 is connected by means of its connection terminal A at the positive d.c.-voltage infeed 1, with its connection terminal B at the negative d.c.-voltage infeed 2 and with its connection terminal C at the connection point or junction 7.

Figure 4:
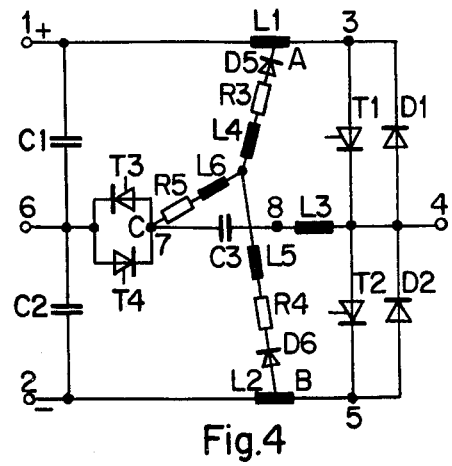

With a further embodiment according to FIG. 4 the connection terminal A is connected with a tap of the choke $L_1$, the connection terminal B with a tap of the choke $L_2$ and the connection terminal C with the junction or connection point 7.

Figure 5:
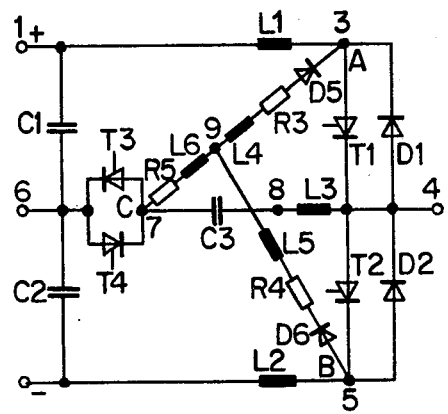

According to a further variant of the exemplary embodiment according to FIG. 5, the terminal A is connected with the connection point or junction 3, the terminal B at the connection point 5 and the terminal C at the connection point 7.

With the exemplary embodiments of FIGS. 6, 7 and 8, as already mentioned, the commutator choke $L_3$ and the commutator capacitor $C_3$ have been interchanged in their position in relation to the exemplary embodiments described in FIGS. 1, 3, 4 and 5. In FIG. 6 the damping circuit is connected by means of its terminal A with the positive d.c.-voltage infeed 1, by means of its terminal B with the negative d.c.-voltage infeed 2 and by means of its terminal C with the junction or connection point 7.

In the arrangement of FIG. 7 the terminal A is connected with a tap of the choke $L_1$, the terminal B at a tap of the choke $L_2$ and the terminal C at a tap of the commutator choke $L_3$.

In the embodiment of FIG. 8 the terminal A is connected with the junction or connection point 3, the terminal B with the junction 5 and the terminal C with the junction or connection point 8.

Apart from the aforementioned variations there are also possible still further symmetrical and unsymmetrical combinations of the connection of the damping circuit within the forced commutated current converter arrangement.

Now in order to explain the mode of operation of the inventive circuit arrangements there will be considered hereinafter, for instance, the exemplary embodiment of FIG. 1, wherein the damping circuit comprises two series circuits of diodes and resistors composed of the elements $R_1$, $D_3$ and $R_2$, $D_4$, respectively, which are respectively directly connected with the positive and negative potential of the supply direct-current voltage $U_g$ (d.c.-voltage infeeds 1 and 2) and conjointly between the auxiliary thyristors $T_3$, $T_4$ and the commutator capacitor $C_3$. In order to describe the commutation operations which occur, reference is made to the state-of-the-art, for instance to the already mentioned article of J. Brenneisen and A. Schönung, entitled "Bestimmungsgrössen des selbstgeführten Stromrichters in sperrspannungsfreier Schaltung bei Steuerung nach dem Unterschwingungsverfahren", ETZ-A, Bd. 90 (1969), H. 14, pages 353 to 357, especially page 353, left-hand column, penultimate paragraph to page 354, left-hand column, second paragraph. Also the inventive current converter arrangement is suitable for the undershoot method. Furthermore, the mode of operation of a forced commutated (self-commutated) current converter has been described in detail in the previously mentioned article of H. W. van den Boom and E. Kohlhuber, entitled "Beanspruchung von Thyristoren in Wechselrichterschaltungen", VDE-Buchreihe, Bd. 11 "Energieelektronik und geregelte elektrische Antriebe", pages 135 to 150; VDE-Verlag Berlin 1966, especially page 139, third paragraph to page 144, second paragraph.

By means of the inventive current converter arrangement there is achieved the beneficial result that an overvoltage at the commutator capacitor $C_3$ can discharge, by means of the conductive primary valve branch $T_1$ and $T_2$, respectively, and the corresponding damping branch $R_1$, $D_3$ and $R_2$, $D_4$, respectively, up to the magnitude of the intermediate circuit direct-current voltage. Consequently, each commutation operation begins with a defined commutation capacitor voltage.

Different criteria can be decisive for the design of the damping circuit. Two types of dimensioning are of practical significance.

Firstly, a low-ohmic design of the damping circuit is possible. An overvoltage at the commutator capacitor is rapidly decayed due to the low-ohm damping circuit. Dimensioning is accomplished such that the balancing or compensation operation, i.e., the discharge operation, occurs at the region of the aperiodic boundary case, i.e., oscillation of the RC-element, composed of the components $R_1$, $C_3$ or $R_2$, $C_3$ respectively, i.e., there are present small discharge times. Consequently, the non-symmetry in the commutation process is immediately completely balanced after each commutation.

Additionally, there is thereby obtained a good reverse voltage limiting effect at the auxiliary thyristors $T_3$, $T_4$.

Secondly, there is possible a high-ohmic design of the damping circuit. If during operation of the current converter there only slowly forms a non-symmetry of the commutation current, then this can also be prevented by a high-ohm damping circuit having large discharge time-constants, governed by the RC-element composed of the components $R_1$, $C_3$ and $R_2$, $C_3$, respectively. In this case an unsymmetry, under circumstances, is first compensated after a number of commutation operations. The current load of the damping circuit is, however, advantageously reduced thereby.

With a three-branch design of the damping circuit the resistor $R_5$ in the first instance serves to compensate unsymmetrical commutation operations, i.e., the value of the resistance $R_5$ determines the discharge times which prevail. The low-ohmic resistors or resistances $R_3$ and $R_4$ primarily serve for protecting the diodes $D_5$ and $D_6$. With the two-branch construction of the damping circuit both of the resistors or resistances $R_1$ and $R_2$ serve for the decay of the overvoltages at the commutator capacitor $C_3$ and the values of the resistances determine the prevailing discharge times.

In most instances the damping circuit only need be equipped with resistances and diodes. However, in order to appropriately dimension the discharge operations which arise, especially as concerns their frequency—there is desired for instance a compensation operation at the region of the aperiodic boundary case—there is optionally possible the incorporation of reactance coils in the individual branches of the damping circuit.

While there are shown and described present preferred embodiments of the invention, it is to be distinctly understood that the invention is not limited thereto, but may be otherwise variously embodied and practiced within the scope of the following claims. Accordingly,

What I claim is:

1. A forced commutation power converter arrangement in reverse voltage free circuit configuration comprising:
   positive and negative direct current input terminals and an output terminal;
   a pair of series connected capacitors connected across said positive and negative input terminals and also to each other at a first connection point;
   a commutation circuit composed of:
   a first plurality of controllable current converter means arranged in parallel opposition and connected at one side to said first connection point;
   a commutation capacitor connected to the other side of said controllable current convertor means;
   a commutator choke connected between said commutation capacitor and a second connection point;
   a load circuit connected across said positive and negative terminals, and composed of:
   a second plurality of controllable current converter means connected between said inputs and said second connecting point;
   a first plurality of non-controllable current converter means connected in parallel opposition to said second controllable current converter means; and
   two first chokes, each connected between one of said inputs and a respective one of said second plurality of controllable current converter means;

said commutator capacitor being connected between said first plurality of controllable current converter means of said commutation circuit and said pluralities of controllable and non-controllable current converter means of said load circuit; and a damping circuit connected between said commutator capacitor and said first plurality of controllable current converter means, and comprising a plurality of current converter means, so as to receive, through its plurality of current converter means, voltages supplied to said positive and negative input terminals of said power converter arrangement.

2. The power converter arrangement of claim 1, wherein:

said damping circuit comprises two branches, each having a respective series-connected first resistance and current converter means connected between said second connection point and one of said input terminals.

3. The power converter arrangement of claim 2, wherein:

each of said branches further includes a series-connected second choke.

4. The power converter arrangement of claim 1, wherein:

said damping circuit comprises three branches, of which two branches are connected to the voltages supplied to said positive and negative input terminals, through its plurality on current converter means; and the third branch includes a second resistor and is connected between said commutation capacitor and said first plurality of controllable current converter means of said commutation circuit.

5. The power converter arrangement of claim 4, further including a third choke, connected in series with said second resistor.

6. The power converter arrangement of claim 4, wherein:

all three branches of said damping circuit contain third resistors.

7. The power converter arrangement of claim 6, further including a series-connected fourth choke in each branch.

8. The power converter arrangement of claim 1, wherein all of said controllable current converter means comprise thyristors and all of said current converter means comprise diodes.

* * * * *